United States Patent [19]

Konrad et al.

[11] Patent Number: 5,705,875
[45] Date of Patent: Jan. 6, 1998

[54] GENERATOR END WINDING SYSTEM

[75] Inventors: Kevin Joseph Konrad, Orlando; David Norwood Dorsey, Pensacola; John Barry Sargeant, Oviedo, all of Fla.

[73] Assignee: Westinghouse Electric Corporation, Pittsburgh, Pa.

[21] Appl. No.: 712,656

[22] Filed: Sep. 13, 1996

Related U.S. Application Data

[63] Continuation of Ser. No. 283,592, Aug. 1, 1994, abandoned.
[51] Int. Cl.$^6$ ..................................... H02K 3/46
[52] U.S. Cl. .................. 310/260; 29/596; 310/270; 310/271
[58] Field of Search .................. 29/596, 598; 310/260, 310/270, 271, 43

[56] References Cited

U.S. PATENT DOCUMENTS

| | | | |
|---|---|---|---|
| 2,994,735 | 8/1961 | Marshall et al. | 310/260 X |
| 3,949,257 | 4/1976 | Cooper et al. | 310/260 |
| 4,088,913 | 5/1978 | Prigorovsky et al. | 310/260 |
| 5,436,520 | 7/1995 | Huber | 310/260 |

*Primary Examiner*—Carl E. Hall

[57] ABSTRACT

In an electrodynamic apparatus, a method of securing a coil basket of the type that includes a plurality of top coils and a plurality of bottom coils to a bracing assembly that includes a plurality of support braces includes steps of banding the top coil, the bottom coil and the support brace to each other; positioning a number of inflatable bladders, respectively, between the top coils and the bottom coils in the location of the bandings; and simultaneously inflating the bladders to a predetermined pressure that is sufficient to tension the bandings to a predetermined force, whereby forces that are transmitted to the coil basket from such inflation are imparted evenly throughout the coil basket and at the same time.

7 Claims, 2 Drawing Sheets

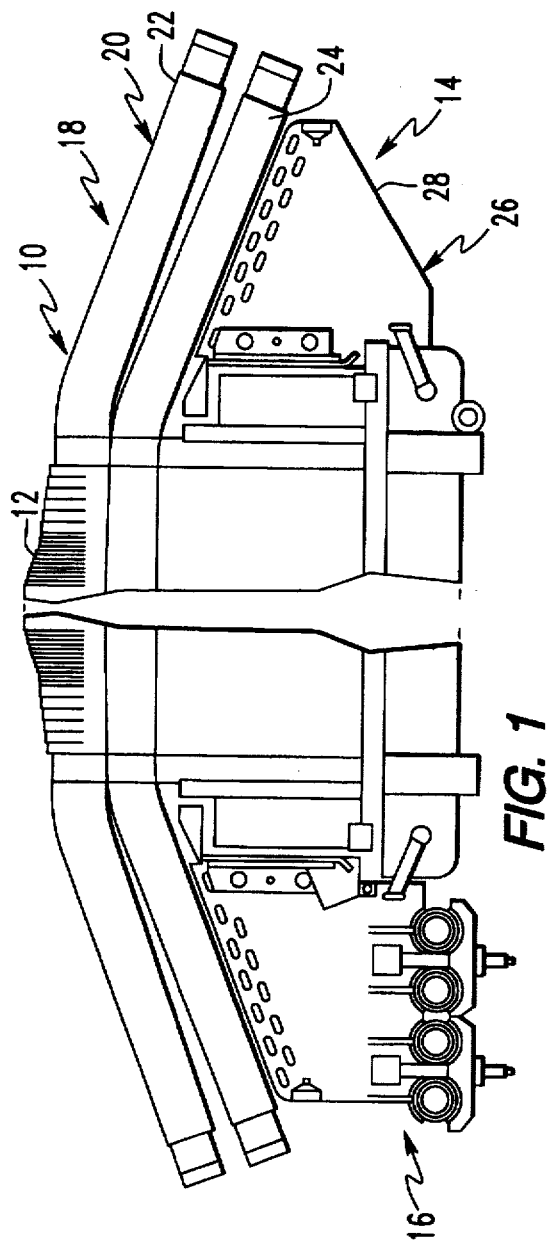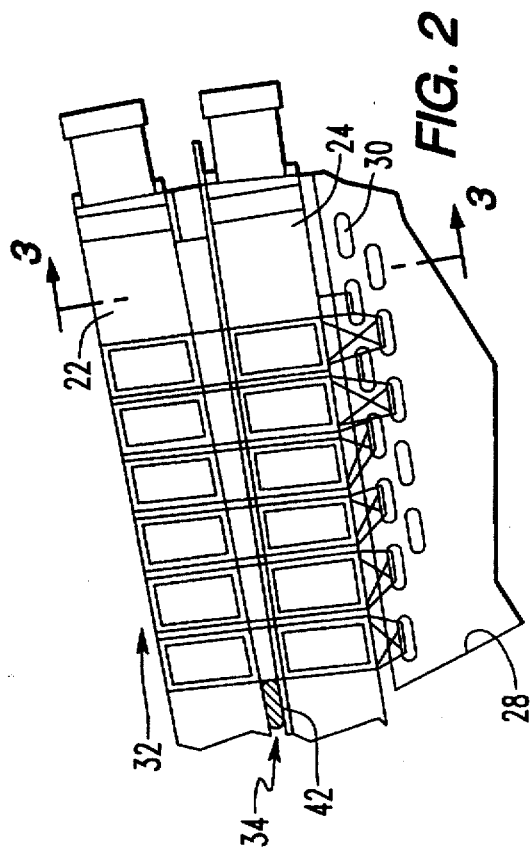

GENERATOR END WINDING SYSTEM

This application is a continuation of application Ser. No. 08/283,592 filed Aug. 1, 1994, now abandoned.

BACKGROUND OF THE INVENTION

1. Field of the Invention

This invention relates generally to the field of large electrodynamic systems, such as electrical power generators. More specifically, this invention relates to an improved system and method for protecting an end winding region of such a system from vibrational or other fatigue damage.

2. Description of the Prior Art

Large electrical power generators of the type that are designed and manufactured by the assignee of this invention, Westinghouse Electric Corporation, produce, in addition to electricity, heat and vibration. Generator components, such as coil portions in the stator end winding regions, must be designed to withstand as many cycles of the stresses and relative motion that are attendant to such heat and vibration as possible.

In the past, the aggregated stator coil end windings of certain large electrical generators were unitized with the stator core by bolting and wrapping. In such designs, however, vibrations from the stator core were transmitted directly to the end winding regions, causing wear. In an effort to mitigate this problem, many present generators incorporate a decoupled design in which the stator coil end winding regions are isolated from the stator core, with the only connection to the core being from the coils themselves. In the decoupled design, a number of bands are used to bind the top and bottom coils together to prevent relative movement. In manufacturing the end winding arrangement, each band must be individually pretensioned to a desired extent. This process, although effective, is quite expensive, both in terms of components and the amount of labor that is required.

It is clear that a long and unfilled need has existed in the prior art for an improved method and system for securing a stator end winding region in an electrodynamic system against heat-induced and vibratory stresses that will occur during system operation.

SUMMARY OF THE INVENTION

Accordingly, it is an object of the invention to provide an improved method and system for securing a stator end winding region in an electrodynamic system against relative movement during system operation.

It is further an object of the invention to provide such a method and system which is less expensive to implement and fabricate, respectively, than methods and systems heretofore known.

In order to achieve the above and other objects of the invention, a method according to one aspect of the invention of securing a coil basket of the type that includes a plurality of top coils and a plurality of bottom coils to a bracing assembly that includes at least one support brace, includes steps of: (a) at a location where a top coil crosses over a bottom coil, binding the top coil, the bottom coil and the support brace to each other; (b) positioning an inflatable bladder between the top coil and the bottom coil in the location of the binding; and (c) inflating the bladder to a predetermined pressure that is sufficient to tension the binding to a predetermined force, whereby the top and bottom coils are effectively constrained against vibrational effects.

A method according to a second aspect of the invention of securing a coil basket of the type that includes a plurality of top coils and a plurality of bottom coils to a bracing assembly that includes a plurality of support braces, includes steps of: (a) at a plurality of locations where a top coil crosses over a bottom coil proximate a support brace, binding the top coil, the bottom coil and the support brace to each other; (b) positioning a number of inflatable bladders, respectively, between the top coils and the bottom coils in the location of the bindings; and (c) simultaneously inflating the bladders to a predetermined pressure that is sufficient to tension the bindings to a predetermined force, whereby forces that are transmitted to the coil basket from such inflation are imparted evenly throughout the coil basket and at the same time.

According to a third aspect of the invention, a vibration-proofed end winding region in an electrodynamic apparatus such as an electrical generator includes a support bracket; a plurality of bottom coils; a plurality of top coils, the top coils intersecting the bottom coils in a plurality of locations, respectively, near the support bracket, the top coils and the bottom coils being attached to the support bracket at the locations, respectively, by a plurality of bindings; and a pressurized bladder positioned between the top coils and the bottom coils at more than one of the locations, the bladder being pressurized at a predetermined pressure so as to tension the binding to a predetermined force, whereby the top and bottom coils are effectively constrained against vibrational effects.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a fragmentary diagrammatical view of an electrodynamic apparatus that is constructed according to a preferred embodiment of the invention;

FIG. 2 is a fragmentary side elevational view of a portion of the apparatus that is depicted in FIG. 1;

DETAILED DESCRIPTION OF THE PREFERRED EMBODIMENT(S)

Figure 3:
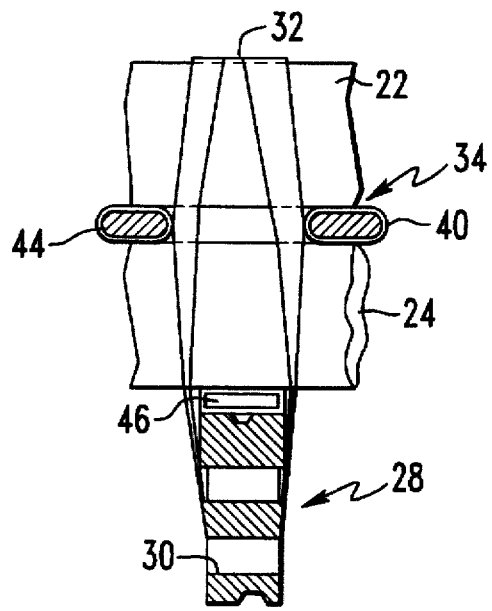
FIG. 3 is a fragmentary cross-sectional view taken along lines 3—3 in FIG. 2.

Referring now to the drawings, wherein like reference numerals designate corresponding structure throughout the views, and referring in particular to FIG. 1, an electrodynamic apparatus 10 that is constructed according to a preferred embodiment of the invention is embodied as an electrical generator 12. Electrical generator 12 has a turbine end 14 and an exciter end 16, as is well known in this area of technology. Generator 12 further includes a stator end winding region 18 at both the exciter end 16 and the turbine end 14.

End winding region 18 includes a coil basket 20, which includes a number of top coils 22 and a corresponding number of bottom coils 24, as is also well known in this area of technology. Each top coil 22 is electrically connected to a bottom coil 24, although not the bottom coil 24 immediately therebeneath, in what is known as both a series and a crossover connection.

As may further be seen in FIG. 1, generator 12 includes a bracing assembly 26 for bracing the end winding region 18 against vibratory and other stresses that are produced during operation of generator 12. Bracing assembly 26 includes a number of support braces 28, which are arrayed circumferentially about the end circumference of the stator, as may be seen in FIG. 4. Each support brace 28 has a number of holes 30 defined therein, as is best shown in FIG. 2. As may best be seen in FIGS. 2, 3 and 4, at locations where a top coil 22 crosses over a bottom coil 24 in the vicinity of a support brace 28, a banding 32 is used to band the top coil 22, the bottom coil 24 and the support brace 28 together. In the preferred embodiment, each banding 32 is formed of a cured resin-impregnated lamination of bands, which passes over top coil 22 and beneath bottom coil 24 through holes 30 in support brace 28 to securely band the top and bottom coils 22, 24 to the support brace 28.

Figure 4:
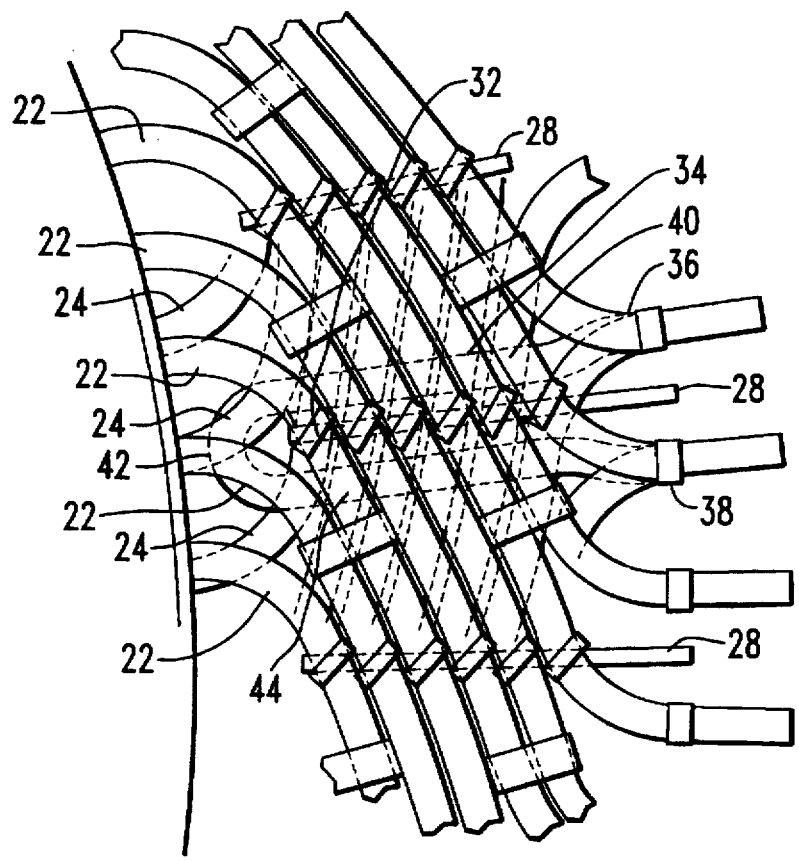
FIG. 4 is a fragmentary radial end view of the apparatus that is depicted in FIGS. 1–3.

Referring now to FIGS. 2, 3 and 4, one important aspect of the invention is the provision of a U-shaped inflatable bladder 34 that is situated about each support brace 28 so as to be positioned between a top coil 22 and a bottom coil 24 at each location at which a banding 32 is located. As may best be seen at FIG. 4, inflatable bladder 34 has a first end 36 that terminates at an outer circumference of the coil basket 20, and a second end 38 that is also so positioned, but on an opposite side of support brace 28 and bands 32 from first end 36. Inflatable bladder 34 further includes a first leg portion 40 which extends from first end 36 roughly parallel to support brace 28 and between the respective top coils 22 and bottom coils 24 at the banding locations that involve the support brace 28 about which inflatable bladder 34 is positioned. As may be seen in FIG. 3, the first leg portion 40 of inflatable bladder 34 is positioned on the right hand side of bandings 32 and support brace 28. Inflatable bladder 34 further includes a bend portion, which connects first leg portion 40 with a second leg portion 44, as may best be seen in FIG. 4. Bend portion 42 thus forms a semicircle about the innermost end of support brace 28 and bands 32, and gives inflatable bladder 34 its U-shaped configuration. Bend portion 42 may be seen in cross section in FIG. 2. The second leg portion 44 of inflatable bladder 34 extends roughly parallel to support brace 28 on an opposite side of support brace 28 and bands 32 from first leg portion 40. Second leg portion 44 extends between the respective top coils 22 and bottom coils 24 at each of the banding locations that involve that particular support brace 28, in an orientation that is symmetrical to that of first leg portion 40. As may be seen in FIG. 3, second leg portion 44 is symmetrically opposite first leg portion 40 with respect to support brace 28 and banding 32.

Bracing assembly 26 further includes a shim 46 that is positioned between support brace 28 and bottom coil 24. Preferably, shim 46 is formed as a green glass core having a resin-impregnated dacron wrapping formed thereabout, as is well known in this area of technology.

One important aspect of the invention is the process that is used, according to the preferred embodiment, to install bracing assembly 26 onto the electrodynamic apparatus 10. First, the support braces 28 are secured onto the generator 12 in the orientation that is depicted in FIG. 4. Then, the bottom coils 24 are wound onto the generator 12, and the shims 46 are positioned between the bottom coils 24 and the respective support braces 28 in the orientation that is shown in FIG. 3. The top coils 22 are then installed onto the system 12.

At this point, the bandings 32 are installed to secure the top coils 22 and the bottom coils 24 to the support brace 28 in those locations where the top coils 22 cross over the bottom coils 24 proximate to a support brace 28. This is performed by laminating resin-impregnated fiberglass belts, which preferably are about 15 mils thick, to the configuration that is depicted in FIGS. 2 and 3. At this point, the bandings 32 will be approximately hand tight. The bands are cured at approximately 120 degrees Centigrade for approximately 16 hours to reach their intended strength, stiffness and creep resistance characteristics. After the bandings 32 have been completed, an inflatable bladder 34 is prepared for installation onto the system 10. First, an inflatable bladder 34 is prepositioned about each of the support braces 28 on both the exciter end 16 and the turbine end 14 of the generator 12. Preferably, inflatable bladder 34 is then communicated with a vacuum or underpressure in order to remove all gases from the inflatable bladder 34, thus flattening the inflatable bladder 34. The flattened bladder is then in the configuration that is shown in FIGS. 2–4 and described above. Once this has been accomplished, all of the inflatable bladders 34 are then communicated with a common source of pressure to simultaneously inflate the bladders 34 to a predetermined pressure. This is, in the preferred embodiment, accomplished by inflating the respective bladders 34 with pressurized nitrogen to a pressure that is preferably at least 160 psi, with the most preferred pressure being approximately 170 psi. This will bias the respective top coils 22 apart from the bottom coils 24, thus tensioning bandings 32 to a predetermined force. Preferably, bandings 32 are tensioned to a force that is, at a minimum, equal to four thousand pounds of force for each support brace 28. Preferably, this force is within a initial range of 9000–10,000 pounds of force. In the configuration shown in FIG. 4, this works out to a minimum of 660 pounds of force per each banding 32, with a preferred range of 1500–1670 pounds of force per banding location 32. By simultaneously inflating the bladders 34, the resulting stresses within the coil basket 20 are applied as evenly as possible, so as to prevent deformation or damage to the components of the coils basket 20.

At this point, each individual inflatable bladder 34 is, sequentially, evacuated of the pressurized nitrogen, and is then filled with a pressurized resin to a pressure that is equal to the pressure within the other inflatable bladders 34. The simultaneous inflation of the bladders prevents premature relaxation of the desired preload.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A vibration-proofed end winding region in an electrical generator, comprising:

a support brace lying in a generally radial plane;

a plurality of bottom coils;

a plurality of top coils, said top coils intersecting said bottom coils in a plurality of locations, respectively, near said support brace, said top coils and said bottom coils being attached to said support brace at said locations, respectively, by a plurality of bandings; and a U-shaped pressurized bladder having first and second portions, said first and second portions being positioned parallel to said plane and being further positioned between said top coils and said bottom coils at more than one of said locations, said bladder being pressurized at a predetermined pressure so as to tension the bandings to a predetermined force, whereby the top and bottom coils are effectively constrained against vibrational effects.

2. An end winding region according to claim 1, wherein said pressurized bladder is filled with a pressurized resin.

3. An end winding region according to claim 1, wherein said pressurized bladder is pressurized substantially to at least 160 psi.

4. An end winding region according to claim 3, wherein said pressurized bladder is inflated to a pressure of approximately 170 psi.

5. An end winding region according to claim 1, wherein said pressurized bladder is pressurized sufficiently to tension the bandings to a total force that is substantially within the range of 4,000 to 10,000 lbs of force.

6. An end winding region according to claim 5, wherein said pressurized bladder is pressurized sufficiently to tension the bandings to a total force that is substantially within the range of 9,000 to 10,000 lbs of force per support brace.

7. An end winding region according to claim 1, wherein said pressurized bladder is positioned between said top coils and said bottom coils at all of said locations.

* * * * *